(12) United States Patent
Crego et al.

(10) Patent No.: US 7,207,165 B2
(45) Date of Patent: Apr. 24, 2007

(54) NON-FRANGIBLE OBJECT DETECTION METHOD AND APPARATUS FOR USE WITH HARVESTER

(75) Inventors: John B. Crego, New Holland, PA (US); Arthur George Haas, Grand Forks, ND (US); Michael Jacob Digman, Denver, PA (US)

(73) Assignee: CNH America LLC, New Holland, PA (US)

( * ) Notice: Subject to any disclaimer, the term of this patent is extended or adjusted under 35 U.S.C. 154(b) by 111 days.

(21) Appl. No.: 11/187,367

(22) Filed: Jul. 22, 2005

(65) Prior Publication Data

US 2007/0028576 A1 Feb. 8, 2007

(51) Int. Cl.
*A01D 75/18* (2006.01)
(52) U.S. Cl. ............ 56/10.2 J; 56/10.2 R; 56/DIG. 15; 56/DIG. 24; 460/2; 460/5; 367/99
(58) Field of Classification Search ............. 56/10.2 R, 56/10.2 J, DIG. 15, DIG. 24; 460/2, 5; 367/99
See application file for complete search history.

(56) References Cited

U.S. PATENT DOCUMENTS

| | | | |
|---|---|---|---|
| 1,806,928 A | | 5/1931 | Bartels |
| 2,768,627 A | | 10/1956 | Wolgast |
| 3,675,660 A | | 7/1972 | Girodat |
| 3,805,798 A | | 4/1974 | Girodat |
| 4,275,546 A | * | 6/1981 | Bohman et al. ............... 460/2 |
| 4,294,062 A | | 10/1981 | Seymour |
| 4,305,244 A | | 12/1981 | Seymour et al. |
| 4,322,933 A | | 4/1982 | Seymour |
| 4,344,074 A | | 8/1982 | Strosser et al. |
| 4,353,199 A | | 10/1982 | Chow et al. |
| 4,707,972 A | | 11/1987 | Knepper |
| 4,720,962 A | | 1/1988 | Klinner |
| 5,443,421 A | | 8/1995 | Heintzman |
| 5,462,487 A | | 10/1995 | Farley et al. |
| 6,298,641 B1 | | 10/2001 | Digman et al. |
| 6,430,903 B1 | | 8/2002 | Christiansen et al. |
| 6,601,372 B1 | | 8/2003 | Heinsey et al. |

\* cited by examiner

*Primary Examiner*—Thomas B. Will
*Assistant Examiner*—Jamie L. McGowan
(74) *Attorney, Agent, or Firm*—Michael C. Harms; John William Stader; Stephen A. Bucchianeri

(57) ABSTRACT

A method and apparatus for use with a non-frangible object detection mechanism on an agricultural harvester, the detection mechanism including a sensing surface and a sensor for sensing force applied to the sensing surface that is associated with a foreign object adjacent the sensing surface, the harvester including a transport surface along which harvested materials are transported toward the sensing surface, the apparatus including at least first and second ramp members positioned between the transport surface and the sensing surface, the ramp members separated by a gap, each ramp member including a front ramp surface that extends between a front ramp end adjacent the transport surface and a ramp member apex, the ramp member apexes positioned at a location higher than the sensing surface and proximate the sensing surface, wherein, as harvested material and non-frangible objects are conveyed along the transport surface and toward the sensing surface, at least a portion of the harvested material passes between the ramp members to the sensing surface and at least a portion of the non-frangible objects move along the ramp surfaces and are forced over the ramp apexes to descend toward the sensing surface.

25 Claims, 6 Drawing Sheets

NON-FRANGIBLE OBJECT DETECTION METHOD AND APPARATUS FOR USE WITH HARVESTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention pertains to a foreign object (e.g., stone, piece of metal, etc.) detection method and apparatus for detecting and removing discrete hard non-frangible objects from mobile agricultural equipment. Specifically, self-propelled combine harvesters and forage harvesters are adapted with an apparatus that performs the method of detection of rocks and other discrete hard objects to permit the reliable removal of rocks and non-frangible objects from harvested crop material during crop harvesting operations.

In the context of this disclosure, unless indicated otherwise, the phrase "non-frangible objects" will be used generally to refer to any hard non-frangible objects of at least a minimum size that may be picked up by a harvesting machine in a field including but not limited to stones, rocks, pieces of metal, pieces of wood, etc. In at least some embodiments the minimum size will be approximately three inches in length or diameter although the present invention should not be so limited. In other embodiments the minimum size may be anywhere from one inch to five or more inches in length or diameter.

In the art of mechanically harvesting crops, it is known that self-propelled agricultural vehicles, such as combine harvesters and forage harvesters, are used to mechanically harvest crops. Typically, these vehicles are equipped with a harvesting implement, or header, that includes a reel for pulling crops into an array of blades for cutting the crop, wherein the cut crop material is pulled further into the header along a transport surface by an auger. Once past the auger, the cut crop material is carried by an elevator to a threshing and sorting mechanism that removes unwanted chaff material from the desired crop matter before the crop matter reaches a storage compartment carried by the vehicle.

The above described simple crop harvesting process is complicated by the fact that non-frangible objects are often pulled into the header with the crops. Unfortunately, non-frangible objects (e.g., stones, pieces of metal, etc.) can cause damage to the elevator and threshing mechanisms. To minimize equipment damage from non-frangible objects, various methods and apparatuses have been developed to detect and remove non-frangible objects from the header before the cut crop material is carried by the elevator into the threshing and sorting mechanism.

An exemplary stone ejecting system may include an active system which utilized some sort of an electronic sensor, such as an acoustical transducer typically in the form of a piezoelectric disc mounted in a sensing plate in conjunction with a stone trap. The electronic sensor responds to the characteristics of the sound, such as the amplitude and frequency, that an impacting stone generated in the sensing plate. This signal would then be transferred through an electronic circuit that filtered out the range within which the amplitude and frequency was characteristic of stones. Within this characteristic spectral range the electronic circuit automatically activated a latch releasing mechanism on a door along the bottom of the in-feed housing that would pivot open to permit the stones or hard objects to be ejected from the feeder house, along with a small amount of crop material.

An exemplary detection/ejection system includes a sensor, a sensing plate including a sensing surface, a discriminating circuit and a solenoid operated trap door. Here, the sensing plate and trap door are consecutively placed along the path of harvested material travel. The sensor is often a piezoelectric ceramic disc linked to the sensing plate and generates signals indicative of the type of material that impacts or is currently on the sensing plate. For instance, the sensor may generate signals whenever a stone or the like impacts the sensing surface of the plate or when a stone vibrates on the sensing plate. Here, signal characteristics known to be associated with non-frangible objects are known (e.g., amplitude and frequency of vibrations, signatures associated with impacting stones, pieces of metal, etc.) and the discriminating circuit is designed to distinguish characteristics of non-frangible objects from characteristics associated with harvested crop materials. When a non-frangible object is detected, a signal is provided to the solenoid causing the solenoid to open the trap door so that the non-frangible object is ejected from the system.

Unfortunately, several factors make it difficult to accurately distinguish non-frangible objects from harvested crop materials. First, as harvested material is transported over the sensing surface, non-frangible objects are usually mixed in with harvested crop material so that the non-frangible objects often do not make direct contact with the sensing surface. In these cases the harvested crop material operates as a type of muffler to stifle the signals associated with the non-frangible objects thereby making it difficult to distinguish those objects from the harvested crop materials.

Second, despite efforts to isolate the sensing plate and sensor from other harvester components, in many applications harvester and harvesting related noise (e.g., harvester engine vibrations, jarring of the vehicle as it travels along the ground, rocks impacting the exterior of the header during harvesting operations, etc.) make it difficult to distinguish non-frangible objects from harvested crop materials. Consequently, unless signal characteristics indicative of non-frangible objects are precisely known and the discriminating circuit is precisely tuned to pick up the non-frangible object signal characteristics, incorrect object identifications can occur which lead to either opening of the trap door when not necessary and loss of crop material or passing of non-frangible objects to the elevator and threshing mechanisms resulting in damaged equipment.

Thus, it would be advantageous to have a mechanism or apparatus that could increase the accuracy of non-frangible object detection in harvesting machines.

BRIEF SUMMARY OF THE INVENTION

An exemplary embodiment of the invention includes an apparatus for use with a non-frangible object detection mechanism on an agricultural harvester, the detection mechanism including a sensing surface and a sensor for sensing force applied to the sensing surface that is associated with a foreign object adjacent the sensing surface, the harvester including a transport surface along which harvested materials are transported toward the sensing surface, the apparatus including at least first and second ramp members positioned between the transport surface and the sensing surface, the ramp members separated by a gap, each ramp member including a front ramp surface that extends between a front ramp end adjacent the transport surface and a ramp member apex, the ramp member apexes positioned at a location higher than the sensing surface and proximate the sensing surface, wherein, as harvested material and non-frangible objects are conveyed along the transport surface and toward the sensing surface, at least a portion of the harvested material passes between the ramp members to the sensing surface and at least a portion of the non-frangible objects move along the ramp surfaces and are forced over the ramp apexes to descend toward the sensing surface.

In at least some embodiments the at least first and second ramp members include a plurality of ramp members positioned between the transport surface and the sensing surface where adjacent ramp members are separated by gaps, each ramp member including a front ramp surface that extends between a front ramp end adjacent the transport surface and a ramp member apex, the ramp member apexes positioned at a location higher than the sensing surface and proximate the sensing surface. In some embodiments each ramp member is a substantially flat member where an edge of the flat member forms the front ramp surface. In some embodiments the transport surface is formed at least in part by a flat lower surface and where the front ramp ends are substantially flush with the lower surface.

In some cases each of the front ramp surfaces is inclined from the front ramp end to the apex. In some cases each of the ramp members includes a rear ramp surface that extends from the apex toward a rear ramp end where the rear ramp end is adjacent the sensing surface. In some cases, a rear ramp inclination angle is formed by the front ramp surfaces with the transport surface and a front ramp inclination angle is formed by the rear ramp surface and the sensing surface and the front ramp inclination angle is less than the rear ramp inclination angle. In at least some embodiments the front ramp inclination angle is between five degrees and forty-five degrees and the rear ramp inclination angle is between forty-five degrees and 90 degrees or potentially even greater than 90 degrees, allowing the apex of the ramp to slightly overhang a rear edge of the sensing surface.

In some embodiments the ramp members are substantially equi-spaced. In some cases the gaps between adjacent ramp members are between one inch and five inches. In some cases the gaps are approximately three inches.

In at least some embodiments the front ramp surfaces are co-planar with the transport surface and the sensing surface is in a different plane than the transport surface.

In addition, at least some inventive embodiments include an apparatus for use with an agricultural harvester that includes a transport surface along which harvested materials are transported, the apparatus for detecting non-frangible objects in the harvested material, the apparatus comprising a sensing surface proximate the transport surface, a sensor linked to the sensing surface for sensing force applied to the sensing surface that is associated with a foreign object adjacent the sensing surface, at least first and second ramp members positioned between the transport surface and the sensing surface, the ramp members separated by a gap, each ramp member including a front ramp surface that extends between a front ramp end adjacent the transport surface and a ramp member apex, the ramp member apexes positioned at a location higher than the sensing surface and proximate the sensing surface such that, as harvested material and non-frangible objects are conveyed along the transport surface and toward the sensing surface, at least a portion of the harvested material passes between the ramp members to the sensing surface and at least a portion of the non-frangible objects move along the ramp surfaces and are forced over the ramp apexes to descend toward the sensing surface.

In some embodiments the at least first and second ramp members include a plurality of ramp members positioned between the transport surface and the sensing surface where dimensions of gaps between adjacent ramp members are substantially similar. Here, in some cases, the ramp member is a substantially flat member where an edge of the flat member forms the front ramp surface. In some cases the transport surface is formed at least in part by a flat lower surface and where the front ramp ends are substantially flush with the lower surface. In some embodiments each of the front ramp surfaces is inclined from the font ramp end to the apex. In some cases each of the ramp members includes a rear ramp surface that extends from the apex toward a rear ramp end where the rear ramp end is adjacent the sensing surface. In some cases the ramp members are substantially equi-spaced and where adjacent ramp members are more than two inches apart.

In at least some embodiments the apparatus further includes a discriminator circuit and an ejector assembly, the circuit linked to the sensor to receive signals therefrom and programmed to identify signals associated with non-frangible object impact on the sensing surface and to control the ejector assembly to remove non-frangible objects when a non-frangible object is sensed.

Some embodiments include an apparatus for use with a foreign object detection mechanism on an agricultural harvester, the detection mechanism including a sensing surface and a sensor for sensing force applied to the sensing surface that is associated with a foreign object adjacent the sensing surface, the harvester including a transport surface along which harvested materials are transported toward the sensing surface, the apparatus comprising a plurality of ramp members positioned between the transport surface and the sensing surface, adjacent ramp members separated by a gap where the gaps are substantially similarly dimensioned, each ramp member including a front ramp surface that extends between a front ramp end adjacent the transport surface and a ramp member apex, the ramp member apexes positioned at a location higher than the sensing surface and proximate the sensing surface, the front ramp surfaces inclined from the front ramp ends to the apexes such that, as harvested material and non-frangible objects are conveyed along the transport surface and toward the sensing surface, at least a portion of the harvested material passes between the ramp members to the sensing surface and at least a portion of the non-frangible objects move along the ramp surfaces and are forced over the ramp apexes to descend toward the sensing surface.

The invention also includes a method for use with a non-frangible object detection mechanism on an agricultural harvester, the detection mechanism including a sensing surface and a sensor for sensing force applied to the sensing surface that is associated with a foreign object adjacent the sensing surface, the harvester including a transport surface along which harvested materials are transported toward the sensing surface, the method comprising the steps of providing structure between the transport surface and the sensing surface for separating and raising at least a sub-set of non-frangible objects above at least a subset of harvested crop material and to a level higher than the sensing surface, forcing the separated non-frangible objects into an unsupported location above the sensing surface so that the non-frangible objects drop toward the sensing surface and sensing the non-frangible objects when they impact at least one of harvested crop material on the sensing surface and the sensing surface. Here, the step of providing structure may include providing a plurality of ramp members between the transport surface and the sensing surface where the ramp members are separated by gaps and include front ramp surfaces.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
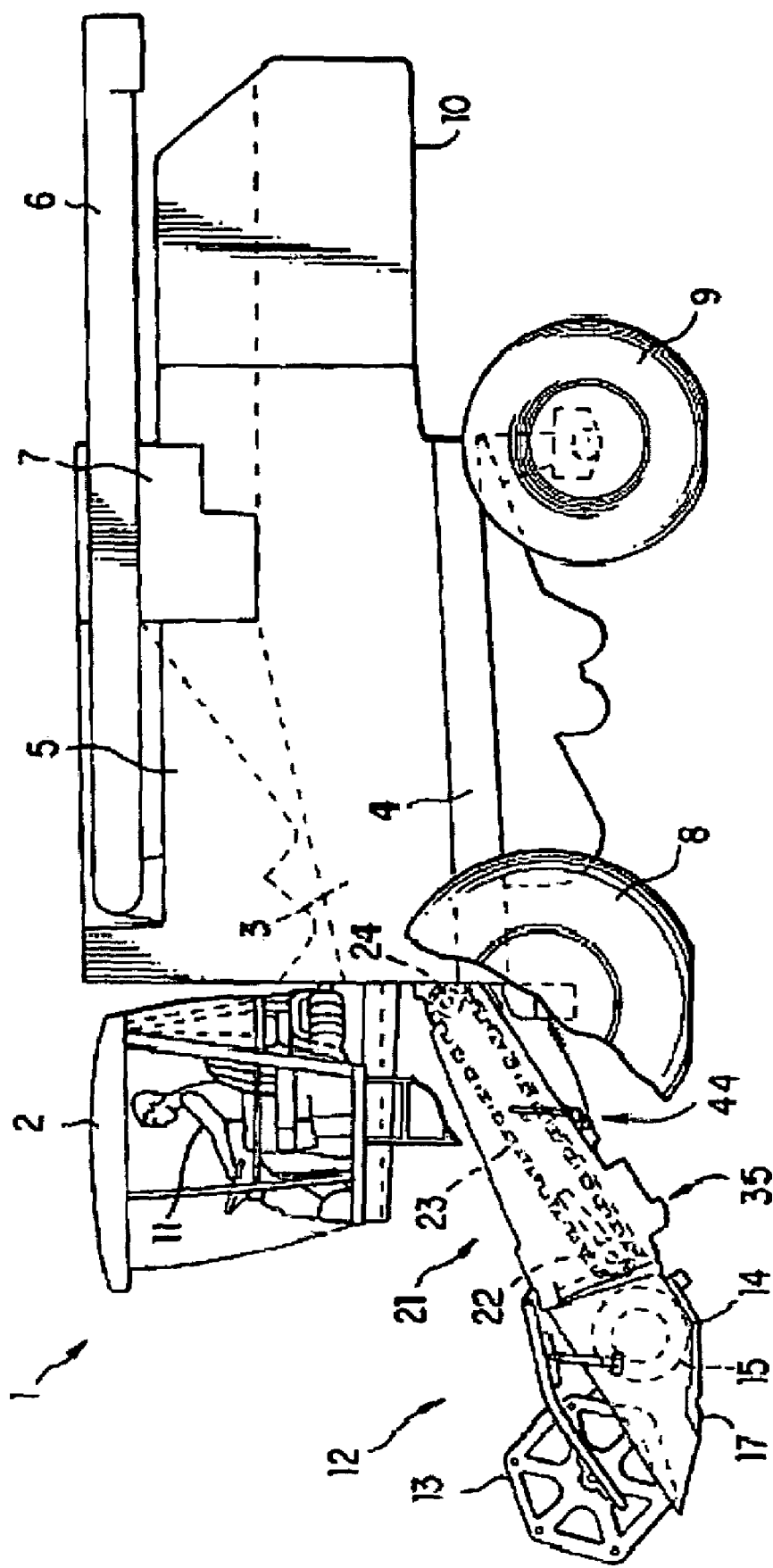
FIG. 1 is a side view of an agricultural harvester consistent with at least one embodiment of the present invention.

Referring now to the figures wherein like reference numerals correspond to similar elements throughout the several views and, more specifically, referring to FIG. 1, the present invention will be described in the context of an agricultural harvester 1 including a self-propelled vehicle having two wheel pairs 8 and 9, an engine 7 mechanically connected to rotate the wheels, a cab 2 where a vehicle operator 11 sits, and a header 12 for harvesting crops. Header 12 includes a reel assembly 13 for pulling crops into the header so that the crops are cut by a blade assembly 17 in the conventional manner and an auger 15 situated in an auger trough 14 for pushing cut crop material into the center of the header. A cut crop elevator 21, or "feederhouse," is located at the center of the header 12 and is fed by the rotation of auger 15.

Figure 2:
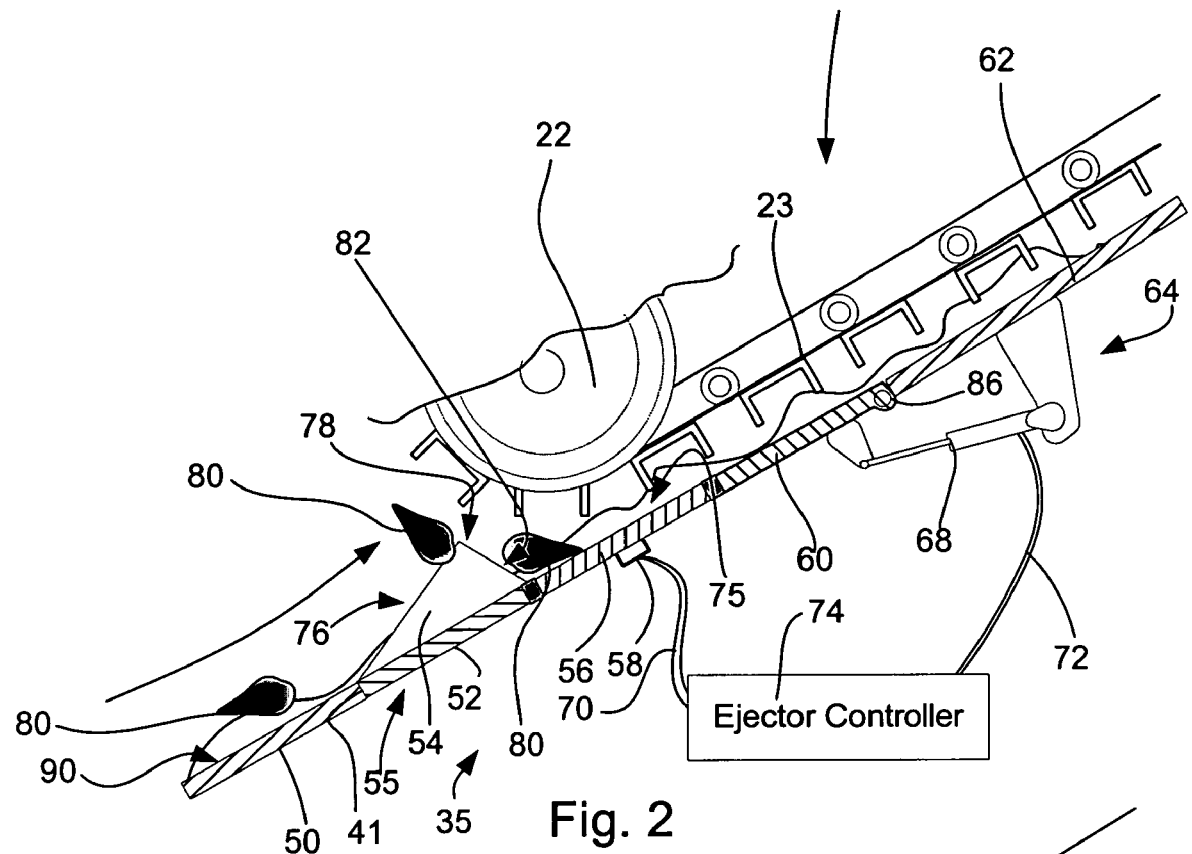
FIG. 2 is a cutaway, close up view of a detector/ejector subassembly according to at least some inventive embodiment.

Referring also to FIG. 2, cut crop material moves from auger 15 to (or a draper arrangement) elevator 21 where the cut crop material is carried by an elevator apron 23 from a front drum 22 to a rear drum 24 and into the rearward portions of the harvester 1. Specifically, harvester 1 includes a threshing mechanism 3 and a grain/chaff separation system 4. Once the grain or other crop has been threshed and the chaff removed, the product crop is stored in tank 5. Tube 6 is used to unload the product crop and any chaff is discarded by the chaff spreader 10.

To protect elevator 21, threshing mechanism 3, and other systems of harvester 1 from damage due to stones, rocks, metal pieces, and any other discrete foreign hard and non-frangible objects that are mixed in with the crop matter, the elevator 21 is fitted with a non-frangible object detector/ejector 35. Detector/ejector 35 serves to both detect and to remove any non-frangible objects from the flow of cut crop material passing through the elevator 21, thereby producing a flow of cut crop matter that is essentially free of foreign hard objects.

Figure 4:
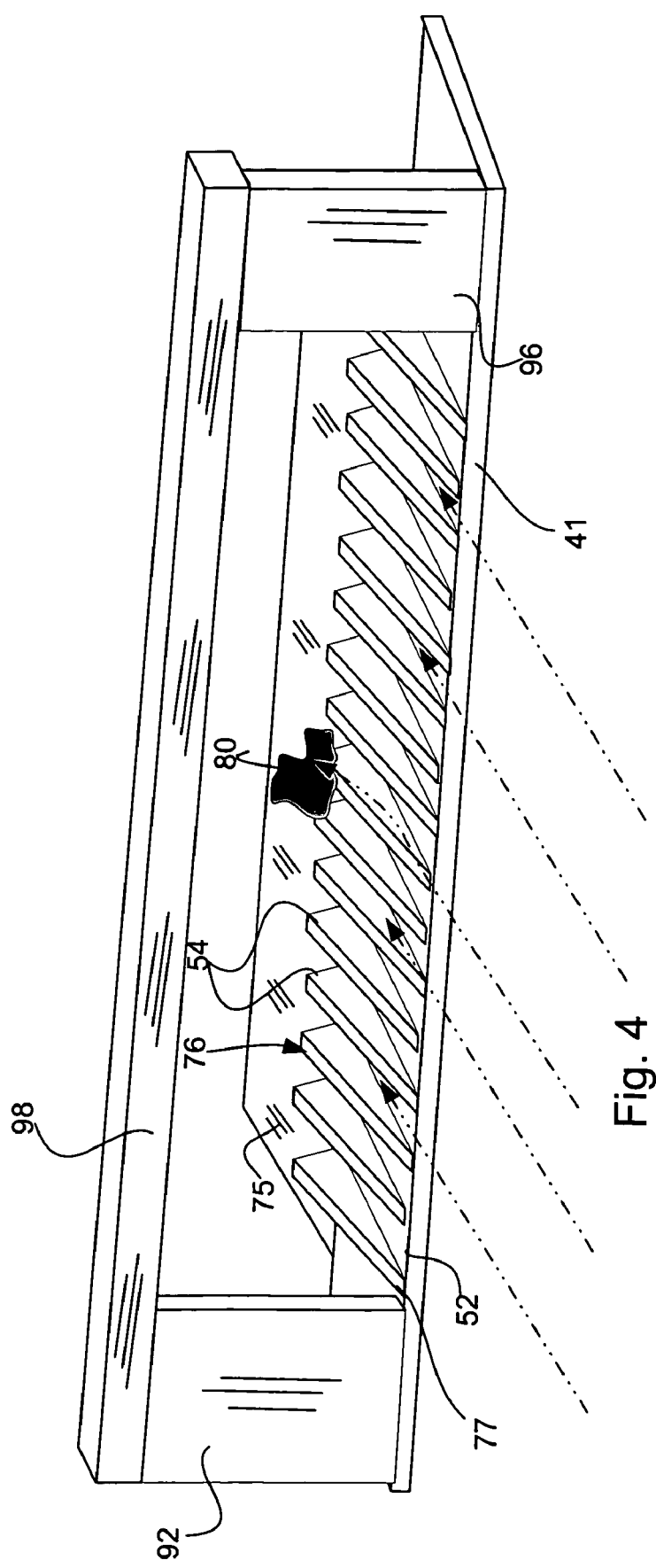
FIG. 4 is a perspective view of a ramp subassembly and other components according to at least one inventive embodiment.
Figure 5:
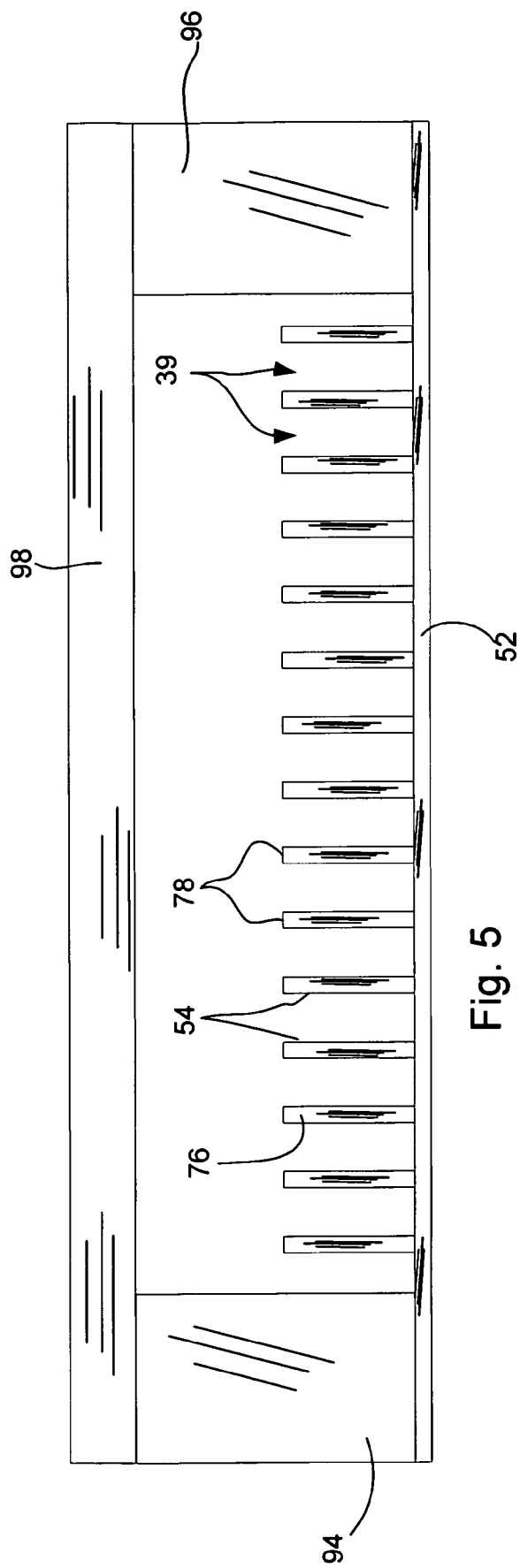
FIG. 5 is a front view of the assembly of FIG. 4.
Figure 6:
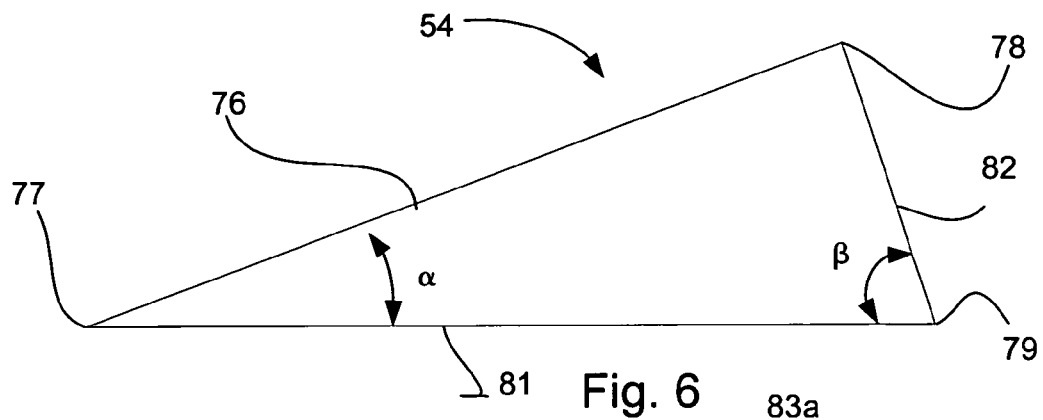
FIG. 6 is a side view of one of the ramp members of FIG. 4.

Referring still to FIG. 2 and also to FIGS. 4, 5 and 6, detector/ejector 35 includes a ramp subassembly 55, a sensing plate 56, a sensor 58, a trap door 60, a door manipulation subassembly 64 and an ejector controller 74. In the illustrated embodiment of FIGS. 2, 4, 5 and 6, the ramp subassembly 55 includes a plurality of ramp members 54 that are mounted to a top surface (not numbered) of a rigid and generally flat plate member 52 so as to extend upward therefrom. As best seen in FIGS. 4 and 6, each of ramp members 54 in this embodiment includes a rigid, generally flat, triangular member having front and rear ends 77 and 79, respectively, an apex 78 located at a mid-point between the front and rear ends 77 and 79, front and rear ramp surfaces 76 and 82 that extend between the front end 77 and apex 78 and the rear end 79 and the apex 78, respectively, and a lower edge 81. In this embodiment ramp surface 76 forms an inclination angle a with lower edge 81 while rear ramp surface 82 forms an inclination angle b with lower edge 81. In some embodiments angle a is less than angle b. In at least some embodiments angle a is between five and 45 degrees while angle b is between 45 and 90 degrees or greater. In an advantageous embodiment angle a is approximately 30 degrees.

Referring still to FIG. 4 and also to FIG. 5, in at least some embodiments ramp members 54 are substantially equi-spaced along the top surface of plate member 52, are separated by similarly dimensioned gaps, two of which are collectively identified by numeral 39 in FIG. 5, and are juxtaposed so that their front ends are located along a front edge 41 of plate member 52. Referring also to FIG. 2, when assembly 55 is installed, front edge 41 is adjacent member 50 and the top surface thereof is flush with transport surface 90 so that the front ends of ramp members 54 are adjacent and generally flush with transport surface 90. In addition, when installed, front ramp surfaces 76 are inclined with respect to transport surface 90 by the inclination angle a. Thus, where the inclination angle a is 30 degrees, ramp surfaces 76 ramp upward from transport surface 90 by 30 degrees.

Referring again to FIG. 2, sensing plate 56 includes a generally flat, rigid and rectilinear sensing surface 75 and an oppositely facing undersurface (not labeled). Sensing plate 56 is mounted in an isolating fashion to plate 52 and other system components to minimize the transfer of harvester vibrations and noise to the plate. Ways to isolate sensing plates are well known in the art and therefore are not described here in detail. Sensor 58 is mounted to the undersurface of sensing plate 56 and, in at least some embodiments, includes a piezoelectric disc that generates signals when objects (e.g., non-frangible objects as well as crop material) impact sensing surface 75. Sensor 58 is linked to ejector controller 74. Sensor plate 56 is mounted adjacent ramp subassembly 55 and, in the illustrated embodiment of FIG. 2, is mounted so that sensing surface 75 is parallel and aligned with the top surface of plate member 52. When sensing plate 56 is installed, rear ramp surfaces 82 are inclined with respect to sensing surface 75 by the inclination angle b. Thus, where the inclination angle b is 75 degrees, ramp surfaces 76 ramp upward from sensing surface 75 by 75 degrees. Here, the rear ramp surfaces 82 are ramped or inclined so that crop material can flow in a reverse direction when necessary.

Figure 3:
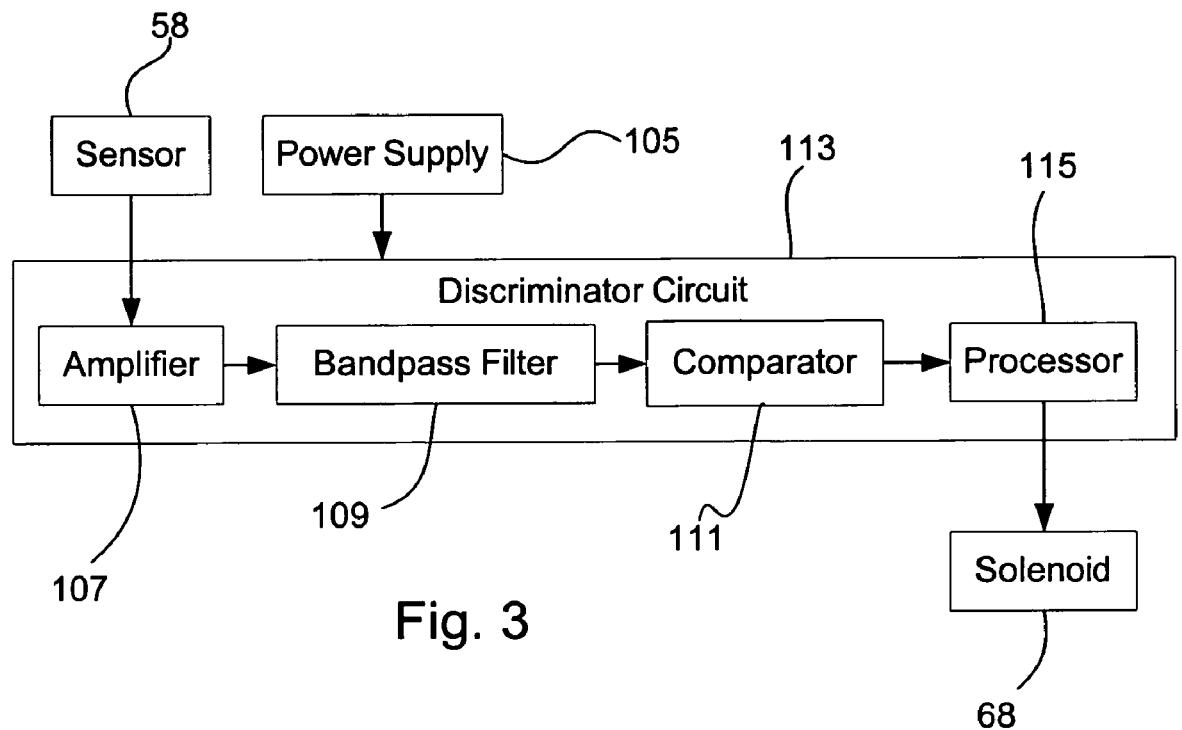
FIG. 3 is a schematic diagram illustrating components of an exemplary ejector controller according to at least some inventive embodiment.

Referring yet again to FIG. 2 and also to FIG. 3, trap door 60 is positioned adjacent sensing plate 56 and is mounted at a pivot point 86 for pivotal movement between a closed position illustrated in FIG. 2 and an open position illustrated in FIG. 3. When closed, a top surface of door 60 guides material upward and to a second elevator transport member 62. When open, door 60 allows material including non-frangible objects to drop out of the elevator passageway. Door manipulation subassembly 64 includes a solenoid 68 that is mounted between the undersurface of member 62 and door 60 and is controllable to open and close door 60. Ejector controller 74 is linked to solenoid 68 to control activation thereof.

Referring now to FIG. 3, ejector controller 74 includes a discrimination circuit 113 operationally connected to sensor 58 and to a power supply 105 and to solenoid 68.

Discrimination circuit 113 includes programmable amplifier 107, variable bandpass filter 109, variable threshold comparator 111, and a processor 115. Power supply 105 is electrically connected to the discrimination circuit to provide power to run the system. Sensor 58 is electrically connected to provide an object sensing input signal I1 to the programmable amplifier 107 of circuit 113.

Amplifier 107 is electrically connected to bandpass filter 109 and amplifies input signal I1 to produce an amplified signal I2 that is inputted into bandpass filter 109. Bandpass filter 109 is electrically connected to comparator 111 and receives and filters signal I2 to produce a frequency filtered signal I3 corresponding to a predetermined and preferred frequency bandwidth. In other words, bandpass filter 109 generally filters out low frequency signals such as would be generated by soft organic crop material passing through feederhouse 21 but transmits high frequency signals such as would be generated by non-frangible objects that impact the sensing surface 75 and that are to be separated from crop matter. Although many different type of bandpass filters may be used, in at least some applications it has been recognized that hardware-fixed bandwidth filters may be most suitable because such filters are relatively inexpensive.

Variable threshold comparator 111 is electrically connected to filter 109, receives signal I3 from filter 109 and generates an ejection signal I4 only when the magnitude of signal I3 exceeds a minimum threshold amplitude.

Processor 115 is electrically connected to comparator 111, receives signal I4 from comparator 111 and analyzes the received signal to determine if signal characteristics are indicative of a non-frangible object. When characteristics of signal I4 are indicative of a frangible object, processor 115 generates an activating signal A1 that is transmitted to solenoid 68.

Figure 7:
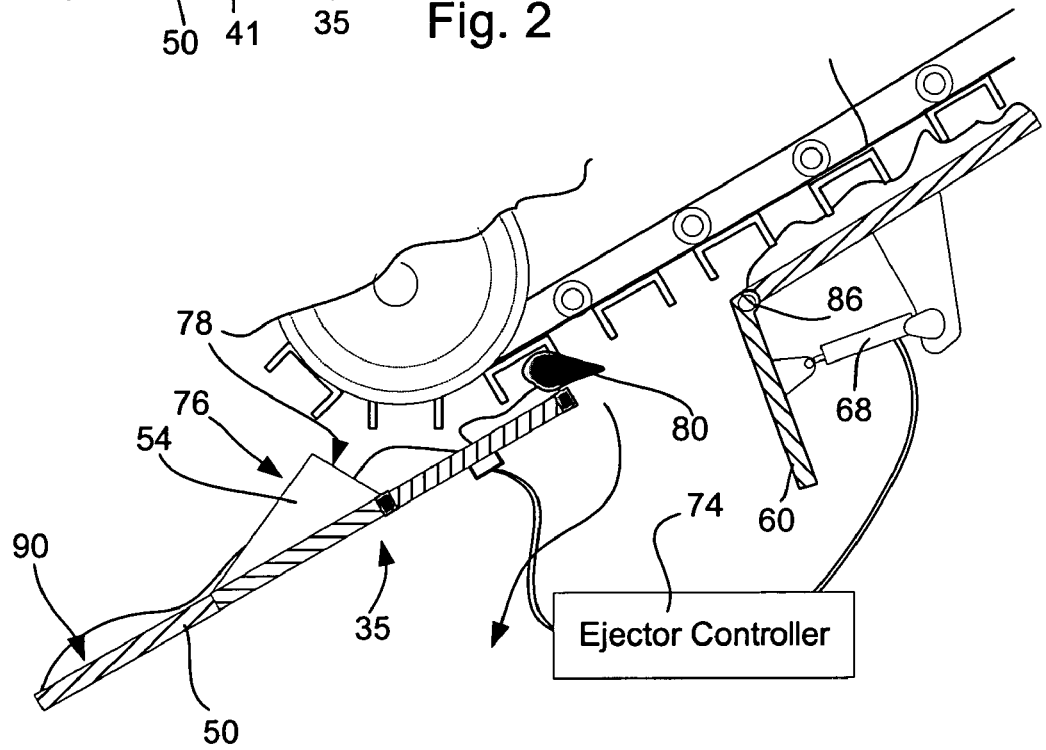
FIG. 7 is similar to FIG. 2, albeit illustrating this subsystem with a trap door in an opened position.

Referring once again to FIGS. 2, 4, 5 and 6, in operation, harvested material including crop and mixed in non-frangible objects is transported along transport surface 90 toward ramp members 54. Once the material reaches members 54, smaller sized crop material and non-frangible objects are forced through the gaps 39 between members 54 while larger non-frangible objects and crop material is forced up the front ramp surfaces 76 of members 54. Eventually the large non-frangible objects are forced to the apexes 78 of members 54 and are pushed over the edges thereof. When a large non-frangible object is pushed over the apexes, the object drops down to the sensing surface and makes a relatively hard and forceful impact which causes sensor 58 to generate a distinctive signal that is relatively easy to distinguish from other sensor signals associated with crop materials and smaller non-frangible objects. As illustrated in FIG. 7, when a non-frangible object is identified, controller 74 causes trap door 60 to open and the object 80 is allowed to drop out of the resulting egress.

Thus, ramp members 54 operate to perform two complimentary processes. First, ramp members 54 operate to separate relatively large non-frangible objects from at least the majority other harvested materials. Second, as the large non-frangible objects are separated, the objects are moved to positions vertically spaced above the sensing surface so that when the objects drop off the ramp members, the force with which the objects impact the sensing surface is increased and the resulting sensor signal can be more distinctive and easier to identify.

While the invention may be susceptible to various modifications and alternative forms, specific embodiments have been shown by way of example in the drawings and have been described in detail herein. However, it should be understood that the invention is not intended to be limited to the particular forms disclosed. For example, while the invention is described above as one that includes a specific type of sensor, other sensor types and sensor configurations (e.g., multiple sensors, etc.) may be used. In addition, while a trap door type ejector system is described, other types of systems such as roller systems for picking non-frangible objects out of material and other ejector configurations are contemplated.

Figure 8:
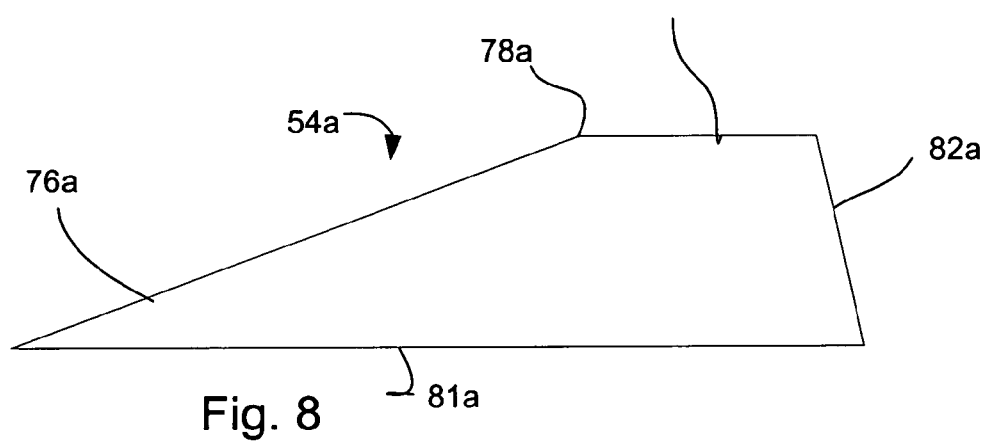
FIG. 8 is similar to FIG. 6, albeit illustrating a differently configured ramp member.
Figure 9:
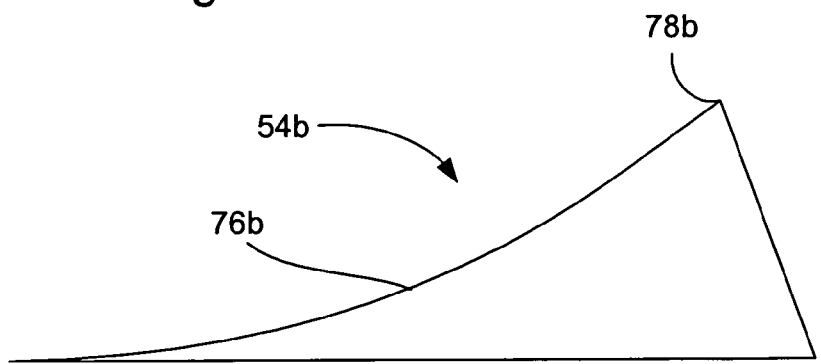
FIG. 9 is similar to FIG. 6, albeit illustrating one additional ramp member type.
Figure 11:
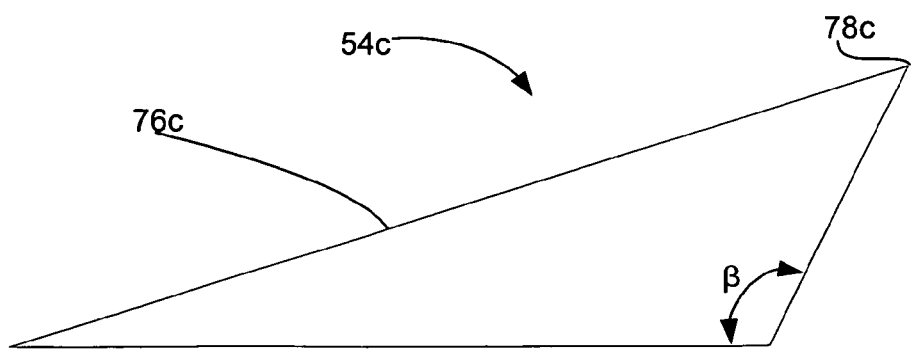
FIG. 11 is a view similar to FIG. 6, albeit illustrating another ramp member type.

Moreover, other ramp configurations are contemplated for separating large non-frangible objects from other materials. For instance, referring to FIG. 8, in at least one embodiment a different type of ramp member 54a may include front and rear ramp surfaces 76a and 82a that are separated by a plateau surface 83a that is substantially parallel to a lower edge 81a where an apex 78a is between front ramp surface 76a and surface 83a. As another instance, referring to FIG. 9, the front ramp surface 76b of another ramp member type 54b may have an increasingly steep slope that terminates at an apex 78b. Similarly, although not illustrated, the rear ramp surfaces 82 may not be ramped in some applications and instead may simply form a 90 degree angle with lower edge 81 (see again FIG. 6). In yet another embodiment 54c illustrated in FIG. 11, angle β may be greater than 90° and an end portion of surface 76c near the apex 78c of the ramp members may overhang the sensing surface (not illustrated).

Figure 10:
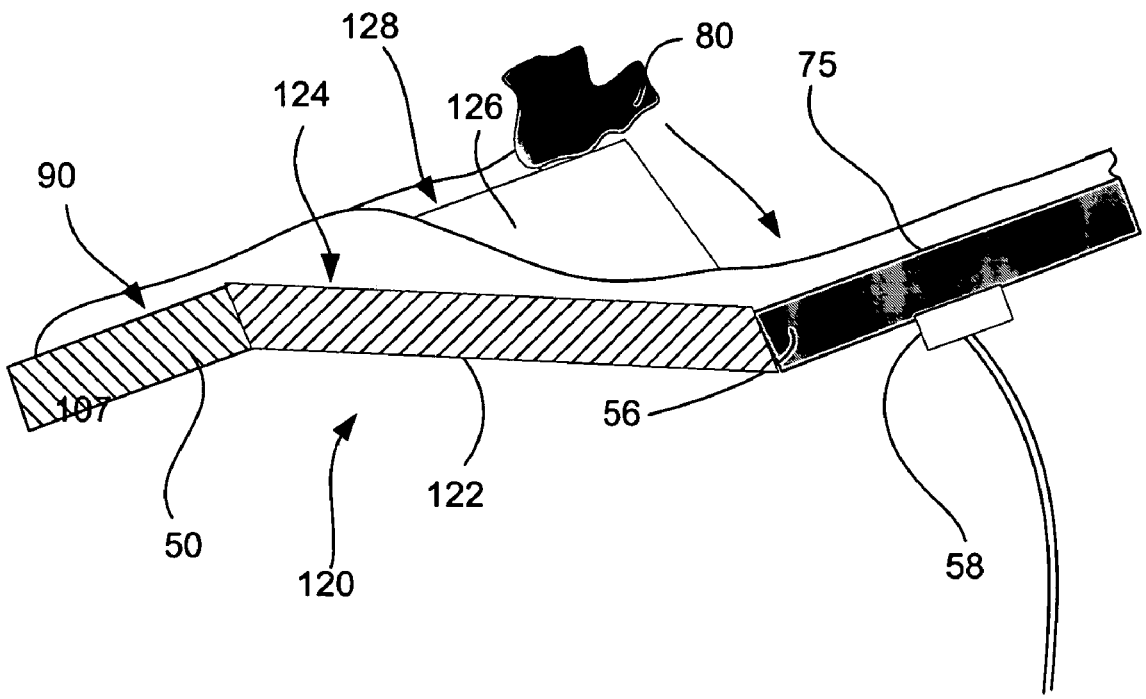
FIG. 10 is a view similar to FIG. 2, albeit illustrating a different type of ramp subassembly configuration.

As yet one other instance, referring again to FIG. 2 and also to FIG. 10, instead of providing a plate member 52 having a top surface that is parallel to transport surface 90 and ramp members that extend upward therefrom, in some embodiments a ramp subassembly 120 may include a plate member 122 that has a top surface 124 that angles downward from transport surface 90 and ramp members 126 may extend upward therefrom so that top ramp surfaces 128 akin to the front ramp surfaces 76 are substantially co-planar with transport surface 90. In this case, as illustrated in FIG. 10, crop material and relatively small non-frangible objects will pass through gaps between adjacent ramp members 126 while larger non-frangible objects will be forced along top surfaces 128 to a height above sensing surface 75 and the end result will be similar to the end result described above where a distinct signal will be generated.

As yet one other example, while the invention is described in the context of an auger type header, the invention could be used with a draper header where the auger is replaced by a conveyor belt to transport crop to the center of the header and to a feeder house.

Thus, the invention is to cover all modifications, equivalents, and alternatives falling within the spirit and scope of the invention as defined by the following appended claims. To apprise the public of the scope of this invention, the following claims are made:

What is claimed is:

1. An apparatus for use with a non-frangible object detection mechanism on an agricultural harvester, the detection mechanism including a sensing surface and a sensor for sensing force applied to the sensing surface that is associated with a foreign object adjacent the sensing surface, the harvester including a transport surface along which harvested materials are transported toward the sensing surface, the apparatus comprising:
   at least first and second ramp members positioned between the transport surface and the sensing surface, the ramp members separated by a gap, each ramp member including a front ramp surface that extends between a front ramp end adjacent the transport surface and a ramp member apex, the ramp member apexes positioned at a location higher than the sensing surface and proximate the sensing surface;
   wherein, as harvested material and non-frangible objects are conveyed along the transport surface and toward the sensing surface, at least a portion of the harvested material passes between the ramp members to the sensing surface and at least a portion of the non-frangible objects move along the ramp surfaces and are forced over the ramp apexes to descend toward the sensing surface.

2. The apparatus of claim 1 wherein the at least first and second ramp members include a plurality of ramp members positioned between the transport surface and the sensing surface where adjacent ramp members are separated by gaps, each ramp member including a front ramp surface that extends between a front ramp end adjacent the transport surface and a ramp member apex, the ramp member apexes positioned at a location higher than the sensing surface and proximate the sensing surface.

3. The apparatus of claim 2 wherein each ramp member is a substantially flat member where an edge of the flat member forms the front ramp surface.

4. The apparatus of claim 3 wherein the transport surface is formed at least in part by a flat lower surface and where the front ramp ends are substantially flush with the lower surface.

5. The apparatus of claim 4 wherein each of the front ramp surfaces is inclined from the font ramp end to the apex.

6. The apparatus of claim 5 wherein each of the ramp members includes a rear ramp surface that extends from the apex toward a rear ramp end where the rear ramp end is adjacent the sensing surface.

7. The apparatus of claim 6 wherein a rear ramp inclination angle is formed by the front ramp surfaces with the transport surface and a front ramp inclination angle is formed by the rear ramp surface and the sensing surface and the front ramp inclination angle is less than the rear ramp inclination angle.

8. The apparatus of claim 7 wherein the front ramp inclination angle is between five degrees and forty-five degrees and the rear ramp inclination angle is between forty-five degrees and 90 degrees.

9. The apparatus of claim 7 wherein the rear ramp inclination angle is greater than 90 degrees.

10. The apparatus of claim 2 wherein the ramp members are substantially equi-spaced.

11. The apparatus of claim 10 wherein the gaps between adjacent ramp members are between one inch and five inches.

12. The apparatus of claim 11 wherein the gaps are approximately three inches.

13. The apparatus of claim 1 wherein the front ramp surfaces are co-planar with the transport surface and the sensing surface is in a different plane than the transport surface.

14. An apparatus for use with an agricultural harvester that includes a transport surface along which harvested materials are transported, the apparatus for detecting non-frangible objects in the harvested material, the apparatus comprising:
   a sensing surface proximate the transport surface;
   a sensor linked to the sensing surface for sensing force applied to the sensing surface that is associated with a foreign object adjacent the sensing surface;
   at least first and second ramp members positioned between the transport surface and the sensing surface, the ramp members separated by a gap, each ramp member including a front ramp surface that extends between a front ramp end adjacent the transport surface and a ramp member apex, the ramp member apexes positioned at a location higher than the sensing surface and proximate the sensing surface such that, as harvested material and non-frangible objects are conveyed along the transport surface and toward the sensing surface, at least a portion of the harvested material passes between the ramp members to the sensing surface and at least a portion of the non-frangible objects move along the ramp surfaces and are forced over the ramp apexes to descend toward the sensing surface.

15. The apparatus of claim 14 wherein the at least first and second ramp members include a plurality of ramp members positioned between the transport surface and the sensing surface where dimensions of gaps between adjacent ramp members are substantially similar.

16. The apparatus of claim 15 wherein each ramp member is a substantially flat member where an edge of the flat member forms the front ramp surface.

17. The apparatus of claim 15 wherein the transport surface is formed at least in part by a flat lower surface and where the front ramp ends are substantially flush with the lower surface.

18. The apparatus of claim 17 wherein each of the front ramp surfaces is inclined from the font ramp end to the apex.

19. The apparatus of claim 18 wherein each of the ramp members includes a rear ramp surface that extends from the apex toward a rear ramp end where the rear ramp end is adjacent the sensing surface.

20. The apparatus of claim 15 wherein the ramp members are substantially equi-spaced and where adjacent ramp members are more than two inches apart.

21. The apparatus of claim 14 further including a discriminator circuit and an ejector assembly, the circuit linked to the sensor to receive signals therefrom and programmed to identify signals associated with non-frangible object impact on the sensing surface and to control the ejector assembly to remove non-frangible objects when a non-frangible object is sensed.

22. An apparatus for use with a foreign object detection mechanism on an agricultural harvester, the detection mechanism including a sensing surface and a sensor for sensing force applied to the sensing surface that is associated with a foreign object adjacent the sensing surface, the harvester including a transport surface along which harvested materials are transported toward the sensing surface, the apparatus comprising:

a plurality of ramp members positioned between the transport surface and the sensing surface, adjacent ramp members separated by a gap where the gaps are substantially similarly dimensioned, each ramp member including a front ramp surface that extends between a front ramp end adjacent the transport surface and a ramp member apex, the ramp member apexes positioned at a location higher than the sensing surface and proximate the sensing surface, the front ramp surfaces inclined from the front ramp ends to the apexes such that, as harvested material and non-frangible objects are conveyed along the transport surface and toward the sensing surface, at least a portion of the harvested material passes between the ramp members to the sensing surface and at least a portion of the non-frangible objects move along the ramp surfaces and are forced over the ramp apexes to descend toward the sensing surface.

23. The apparatus of claim 22 wherein each ramp member is a substantially flat member where an edge of the flat member forms the front ramp surface, the transport surface is formed at least in part by a flat lower surface, the front ramp ends are substantially flush with the lower surface and each of the front ramp surfaces is inclined from the font ramp end to the apex.

24. A method for use with a non-frangible object detection mechanism on an agricultural harvester, the detection mechanism including a sensing surface and a sensor for sensing force applied to the sensing surface that is associated with a foreign object adjacent the sensing surface, the harvester including a transport surface along which harvested materials are transported toward the sensing surface, the method comprising the steps of:

providing structure between the transport surface and the sensing surface for separating and raising at least a sub-set of non-frangible objects above at least a subset of harvested crop material and to a level higher than the sensing surface;

forcing the separated non-frangible objects into an unsupported location above the sensing surface so that the non-frangible objects drop toward the sensing surface; and sensing the non-frangible objects when they impact at least one of harvested crop material on the sensing surface and the sensing surface.

25. The method of claim 24 wherein the step of providing structure includes providing a plurality of ramp members between the transport surface and the sensing surface where the ramp members are separated by gaps and include front ramp surfaces.

* * * * *